US012330225B2

(12) United States Patent
Timmons, Jr. et al.

(10) Patent No.: US 12,330,225 B2
(45) Date of Patent: Jun. 17, 2025

(54) CUT-OFF SAW INCLUDING FORWARD AND REVERSE BLADE ROTATION

(71) Applicant: MILWAUKEE ELECTRIC TOOL CORPORATION, Brookfield, WI (US)

(72) Inventors: Terry Timmons, Jr., Oconomowoc, WI (US); Jonathan Schmitz, Wauwatosa, WI (US); Helton Vandenbush, Belgium, WI (US); Andrew T. Medeiros-Nicholson, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 273 days.

(21) Appl. No.: 17/809,479

(22) Filed: Jun. 28, 2022

(65) Prior Publication Data

US 2022/0410294 A1    Dec. 29, 2022

Related U.S. Application Data

(60) Provisional application No. 63/215,639, filed on Jun. 28, 2021.

(51) Int. Cl.
*B23D 47/12*        (2006.01)
*B23D 59/00*        (2006.01)
(Continued)

(52) U.S. Cl.
CPC .......... *B23D 47/12* (2013.01); *B23D 59/006* (2013.01); *B23D 59/02* (2013.01); *B24D 5/12* (2013.01);
(Continued)

(58) Field of Classification Search
CPC ...... B23D 47/12; B23D 59/006; B23D 59/02; B24D 5/12; B25F 5/02; B28D 1/045; B28D 7/02
See application file for complete search history.

(56) References Cited

U.S. PATENT DOCUMENTS 1,672,238 A    6/1928  Wallace et al.
1,708,345 A    4/1929  Wodack et al.
(Continued)

FOREIGN PATENT DOCUMENTS

CN    201046516 Y    4/2008
CN    202895354 U    4/2013
(Continued)

OTHER PUBLICATIONS

International Search Report and Written Opinion for Application No. PCT/US2022/073229 dated Oct. 21, 2022 (11 pages).

*Primary Examiner* — Adam J Eiseman
*Assistant Examiner* — Fernando A Ayala
(74) *Attorney, Agent, or Firm* — Michael Best & Friedrich LLP

(57) ABSTRACT

A power tool includes a housing, a motor located within the housing, a drive assembly located within the housing and connected to an output of the motor, at least one cutting wheel coupled to the drive assembly, and at least one switch configured to control activation of the motor for directional rotation of the drive assembly in either a forward rotational direction or a reverse rotational direction. The drive assembly is configured to operate in the reverse rotational direction during dry cutting. The drive assembly is configured to operate in the forward rotational direction during wet cutting.

16 Claims, 12 Drawing Sheets

(51) Int. Cl.
  *B23D 59/02*  (2006.01)
  *B24D 5/12*   (2006.01)
  *B25F 5/02*   (2006.01)
  *B28D 1/04*   (2006.01)
  *B28D 7/02*   (2006.01)

(52) U.S. Cl.
  CPC ............. *B25F 5/02* (2013.01); *B28D 1/045* (2013.01); *B28D 7/02* (2013.01)

(56) References Cited

U.S. PATENT DOCUMENTS

| | | | |
|---|---|---|---|
| 1,797,907 A | 3/1931 | Drysdale | |
| 1,830,350 A | 11/1931 | Crowe | |
| 1,830,579 A | 11/1931 | Wappat | |
| 1,830,580 A | 11/1931 | Wappat | |
| 1,833,785 A | 11/1931 | Krieger | |
| 1,850,444 A | 3/1932 | Brumell | |
| 1,854,510 A | 4/1932 | Haas | |
| 1,858,459 A | 5/1932 | Ramey | |
| 1,929,662 A | 10/1933 | Wappat | |
| 1,932,511 A | 10/1933 | Clarke | |
| 2,342,052 A | 2/1944 | Jimerson et al. | |
| 2,543,486 A | 2/1951 | Briskin | |
| 2,586,530 A | 2/1952 | Godfrey | |
| 2,828,784 A | 4/1958 | Damijonaitis | |
| 3,063,481 A | 11/1962 | Sutherland | |
| 3,339,597 A * | 9/1967 | Kohler | B23Q 11/0042 83/478 |
| 3,441,067 A | 4/1969 | Forcier | |
| 3,447,577 A | 6/1969 | Burrows et al. | |
| 3,616,556 A | 11/1971 | Williams | |
| 4,043,237 A | 8/1977 | Pyle | |
| 4,112,271 A | 9/1978 | Marchetti | |
| 4,126,081 A | 11/1978 | Zdeb | |
| 4,308,777 A | 1/1982 | Lawson | |
| 4,450,627 A | 5/1984 | Morimoto | |
| 4,454,901 A | 6/1984 | Thorsness | |
| 4,467,686 A | 8/1984 | Pyle | |
| 4,672,746 A | 6/1987 | Zeilenga | |
| 4,675,999 A | 6/1987 | Ito et al. | |
| 4,848,001 A | 7/1989 | Clark et al. | |
| 4,987,935 A | 1/1991 | Corcoran et al. | |
| 5,084,972 A | 2/1992 | Waugh | |
| 5,161,443 A | 11/1992 | Huang | |
| 5,167,215 A | 12/1992 | Harding, Jr. | |
| 5,315,193 A | 5/1994 | Kummer et al. | |
| 5,327,805 A | 7/1994 | Reichental et al. | |
| 5,680,854 A * | 10/1997 | Kingsley | B28D 1/045 299/39.3 |
| 5,690,391 A | 11/1997 | Kingsley et al. | |
| 5,794,351 A | 8/1998 | Campbell et al. | |
| 5,809,985 A | 9/1998 | Kingsley et al. | |
| 5,810,448 A | 9/1998 | Kingsley et al. | |
| 5,822,864 A | 10/1998 | Campbell et al. | |
| 5,911,482 A | 6/1999 | Campbell et al. | |
| 5,924,208 A | 7/1999 | Saeki | |
| 5,931,072 A | 8/1999 | Shibata | |
| 6,014,811 A | 1/2000 | Taomo et al. | |
| 6,039,037 A | 3/2000 | Taomo et al. | |
| 6,055,734 A | 5/2000 | McCurry et al. | |
| 6,094,827 A | 8/2000 | Campbell | |
| 6,108,912 A | 8/2000 | Radigan | |
| 6,219,922 B1 | 4/2001 | Campbell et al. | |
| 6,237,230 B1 | 5/2001 | Campbell et al. | |
| 6,276,064 B1 | 8/2001 | Campbell | |
| 6,336,483 B1 | 1/2002 | Smith et al. | |
| 6,389,701 B1 | 5/2002 | Friedland | |
| 6,422,275 B1 | 7/2002 | Smith et al. | |
| 6,502,316 B2 | 1/2003 | Campbell et al. | |
| 6,543,143 B2 | 4/2003 | Moore et al. | |
| 6,612,038 B2 | 9/2003 | Onose et al. | |
| 6,612,349 B2 | 9/2003 | Smith et al. | |
| 6,648,742 B1 | 11/2003 | Segiel, Jr. | |
| 6,892,459 B2 | 5/2005 | Okumura et al. | |
| 6,896,016 B1 | 5/2005 | Smith et al. | |
| 6,981,779 B2 * | 1/2006 | Fukuoka | B23Q 11/005 83/13 |
| 7,014,547 B2 | 3/2006 | Kleider | |
| 7,059,947 B2 | 6/2006 | Crover | |
| 7,066,221 B1 | 6/2006 | Smith et al. | |
| 7,073,266 B2 | 7/2006 | Moore et al. | |
| 7,131,897 B2 | 11/2006 | Crover | |
| 7,178,438 B2 | 2/2007 | Xin et al. | |
| 7,219,434 B2 | 5/2007 | Moore et al. | |
| 7,356,930 B2 | 4/2008 | Wadge et al. | |
| 7,465,328 B2 | 12/2008 | Trautner et al. | |
| 7,526,866 B2 | 5/2009 | Schnell et al. | |
| 7,908,951 B2 | 3/2011 | Bohne et al. | |
| 8,069,762 B2 | 12/2011 | Bohne et al. | |
| 8,272,134 B2 | 9/2012 | Soika et al. | |
| 8,388,415 B2 | 3/2013 | Soika et al. | |
| 8,393,939 B2 | 3/2013 | Chianese et al. | |
| 8,511,211 B2 | 8/2013 | Cox | |
| 8,726,773 B2 | 5/2014 | Koegel et al. | |
| 8,782,906 B2 | 7/2014 | Moreno et al. | |
| 8,857,067 B2 | 10/2014 | Moreno | |
| 8,898,913 B1 | 12/2014 | Lones | |
| 9,073,174 B2 | 7/2015 | Rohde et al. | |
| 9,089,941 B2 | 7/2015 | Moreno | |
| 9,242,304 B2 | 1/2016 | Martin | |
| 9,434,015 B2 | 9/2016 | Moreno et al. | |
| 9,527,143 B2 | 12/2016 | Moreno | |
| 9,573,286 B2 | 2/2017 | Gantke et al. | |
| 9,586,335 B2 | 3/2017 | Tsuda et al. | |
| 9,610,704 B2 | 4/2017 | Francis et al. | |
| 11,027,392 B1 * | 6/2021 | McCurry | F21V 33/0084 |
| 2003/0188440 A1 | 10/2003 | Dean | |
| 2004/0117990 A1 | 6/2004 | Bohne et al. | |
| 2005/0169109 A1 | 8/2005 | Watanabe | |
| 2005/0223862 A1 | 10/2005 | Oberheim | |
| 2006/0178097 A1 | 8/2006 | Crover | |
| 2006/0179985 A1 | 8/2006 | Bohne et al. | |
| 2006/0185492 A1 | 8/2006 | Chianese | |
| 2006/0260716 A1 | 11/2006 | Smith et al. | |
| 2007/0017191 A1 | 1/2007 | Miller et al. | |
| 2007/0062048 A1 | 3/2007 | Lin | |
| 2007/0120527 A1 | 5/2007 | Roehm et al. | |
| 2007/0180710 A1 | 8/2007 | Moore et al. | |
| 2008/0236560 A1 * | 10/2008 | Schlough | B28D 7/02 125/13.01 |
| 2008/0244910 A1 | 10/2008 | Patel | |
| 2009/0019710 A1 | 1/2009 | Grossman et al. | |
| 2009/0123705 A1 * | 5/2009 | Sung | B24B 53/017 428/167 |
| 2009/0313831 A1 | 12/2009 | Patel | |
| 2010/0269353 A1 | 10/2010 | Martin | |
| 2010/0275450 A1 | 11/2010 | Refson | |
| 2010/0325903 A1 | 12/2010 | Patel | |
| 2011/0005084 A1 | 1/2011 | Thorson et al. | |
| 2011/0283853 A1 | 11/2011 | Aoyama | |
| 2012/0023760 A1 | 2/2012 | Haas | |
| 2013/0036921 A1 * | 2/2013 | Horstmann | A01F 15/0705 100/40 |
| 2013/0047443 A1 | 2/2013 | Brown et al. | |
| 2013/0145634 A1 | 6/2013 | Cuzdey | |
| 2013/0219725 A1 | 8/2013 | Winkel et al. | |
| 2014/0084718 A1 * | 3/2014 | Naito | B23D 47/00 310/50 |
| 2014/0165412 A1 | 6/2014 | Morita et al. | |
| 2014/0165946 A1 * | 6/2014 | Yanagihara | F02N 11/0803 123/179.1 |
| 2014/0208599 A1 | 7/2014 | Nagahama | |
| 2014/0215839 A1 | 8/2014 | Abe et al. | |
| 2015/0113814 A2 | 4/2015 | Cuzdey | |
| 2015/0328796 A1 | 11/2015 | Okouchi et al. | |
| 2015/0336287 A1 | 11/2015 | Brown et al. | |
| 2015/0360304 A1 | 12/2015 | Lones | |
| 2016/0031106 A1 | 2/2016 | Wu et al. | |
| 2016/0121455 A1 | 5/2016 | Miller et al. | |
| 2016/0121514 A1 | 5/2016 | Martin | |
| 2016/0297051 A1 | 10/2016 | Aiken et al. | |
| 2016/0297052 A1 | 10/2016 | Aiken et al. | |
| 2016/0368166 A1 | 12/2016 | Numata et al. | |

(56) References Cited

U.S. PATENT DOCUMENTS

| | | |
|---|---|---|
| 2017/0160702 A1 | 6/2017 | Yamada |
| 2017/0173818 A1 | 6/2017 | Tsuda et al. |
| 2017/0216941 A1 | 8/2017 | Petersson et al. |
| 2017/0274463 A1 | 9/2017 | Cuzdey |
| 2017/0334056 A1 | 11/2017 | Kawakami et al. |
| 2018/0234724 A1 | 8/2018 | Ström et al. |
| 2018/0257261 A1* | 9/2018 | Ipatenco ............ B28D 7/02 |
| 2018/0361558 A1 | 12/2018 | Fuchs et al. |
| 2018/0361562 A1 | 12/2018 | Baxivanelis |
| 2019/0329337 A1* | 10/2019 | Owens ............... B23D 47/12 |
| 2020/0067435 A1 | 2/2020 | Nishimiya et al. |
| 2020/0094438 A1* | 3/2020 | Winterfjord ......... B28D 1/047 |
| 2020/0206887 A1 | 7/2020 | Schmid et al. |
| 2022/0063007 A1 | 3/2022 | Widlroither et al. |

FOREIGN PATENT DOCUMENTS

| | | | |
|---|---|---|---|
| CN | 103372813 A | 10/2013 | |
| CN | 203711990 U | 7/2014 | |
| CN | 103203776 B | 4/2016 | |
| CN | 208483318 U | 2/2019 | |
| CN | 211218948 U | 8/2020 | |
| CN | 111843042 A | 10/2020 | |
| CN | 212398327 U | 1/2021 | |
| CN | 212795278 U | 3/2021 | |
| DE | 1289292 B | 2/1969 | |
| DE | 1453045 B1 | 1/1971 | |
| DE | 8517523 U1 | 10/1986 | |
| DE | 3633655 A1 | 4/1988 | |
| DE | 9306198 U1 | 8/1993 | |
| DE | 3825477 C2 | 9/1996 | |
| DE | 29809991 U1 | 7/1999 | |
| DE | 19807439 A1 | 8/1999 | |
| DE | 20000596 U1 | 5/2000 | |
| DE | 10130063 A1 | 3/2002 | |
| DE | 20120088 U1 | 6/2002 | |
| DE | 102008015958 A1 | 6/2009 | |
| DE | 102015111174 A1 | 1/2016 | |
| DE | 102015225375 A1 | 6/2017 | |
| DE | 212017000224 U1 | 5/2019 | |
| EP | 0331036 A2 | 9/1989 | |
| EP | 0917937 A2 | 5/1999 | |
| EP | 1767299 A1 | 3/2007 | |
| EP | 2412486 A2 | 2/2012 | |
| EP | 2412487 A2 | 2/2012 | |
| EP | 2881228 A2 | 6/2015 | |
| EP | 2949428 A2 | 12/2015 | |
| GB | 2111192 A | 6/1983 | |
| GB | 2239483 A | 7/1991 | |
| JP | 2005069039 A * | 3/2005 | ............ F04B 21/06 |
| JP | 2011073087 A | 4/2011 | |
| JP | 2015080896 A | 4/2015 | |
| JP | 2017200709 A | 11/2017 | |
| KR | 1020170117867 A | 10/2017 | |
| WO | 2011026304 A1 | 3/2011 | |
| WO | 2011104538 A1 | 9/2011 | |
| WO | 2018097194 A1 | 5/2018 | |

* cited by examiner

CUT-OFF SAW INCLUDING FORWARD AND REVERSE BLADE ROTATION

RELATED APPLICATIONS

This application claims the benefit of U.S. Provisional Patent Application No. 63/215,639, filed Jun. 28, 2021, the entire content of which is hereby incorporated by reference.

FIELD

Embodiments described herein relate to saws, and more particularly to battery pack powered cut-off saws.

SUMMARY

In some aspects, a power tool includes a housing, a first handle and a second handle configured to facilitate two-handed operation of the power tool, a motor located within the housing, a drive assembly located within the housing and connected to an output of the motor, at least one cutting wheel coupled to the drive assembly, and at least one switch configured to control activation of the motor for directional rotation of the drive assembly in either a forward rotational direction or a reverse rotational direction. The drive assembly is configured to operate in the reverse rotational direction during dry cutting. The drive assembly is configured to operate in the forward rotational direction during wet cutting. The power tool also includes a dust collection system configured to collect dust created by the at least one cutting wheel cutting a surface. The at least one switch is a manual switch configured to control the directional rotation of the drive assembly based on the output of the motor.

In some aspects, the at least one switch is a fluid supply detection switch configured to control the directional rotation of the drive assembly based on a detected presence of a fluid supply. The drive assembly is configured to operate in the reverse rotational direction based on the detected presence of the fluid supply. The power tool is a cut-off saw. The at least one cutting wheel is configured for bidirectional cutting. The at least one cutting wheel is one of a blade or an abrasive disk. The cutting wheel has a diameter of at least 9 inches. The cutting wheel has a diameter of at least 14 inches. The cutting wheel has a diameter of between about 9 inches and about 16 inches. The power tool also includes a guard configured to cover at least a portion of the circumference of the at least one cutting wheel.

In some aspects, a system including a power tool that includes a housing, a motor located within the housing, a drive assembly located within the housing and connected to an output of the motor, a first handle and a second handle configured to facilitate two-handed operation of the power tool, at least one cutting wheel coupled to the drive assembly, and at least one switch configured to control activation of the motor for directional rotation of the drive assembly in either a forward rotational direction or a reverse rotational direction. The system also includes a fluid distribution system coupled to the power tool. The system further includes a dust collection system coupled to the power tool.

In some aspects, a method for cutting a surface includes activating a power tool including a housing, a motor located within the housing, a drive assembly located within the housing and connected to an output of the motor, a first handle and a second handle configured to facilitate two-handed operation of the power tool, at least one cutting wheel coupled to the drive assembly, and at least one switch. The method also includes controlling activation of the motor for direction rotation of the drive assembly in a forward rotational direction when the at least one switch is in a first state, controlling activation of the motor for direction rotation of the drive assembly in a reverse rotational direction when the at least one switch is in a second state, and advancing the power tool toward a surface to cut the surface.

In some aspects, the method also includes coupling a fluid distribution system to the power tool, detecting a presence of the fluid distribution system, and automatically switching, by the at least one switch, a rotation of the at least one cutting wheel to a forward rotation. The method further includes coupling a dust collection system to the power tool, a user manually switching, by the at least one switch, a rotation of the at least one cutting wheel to a reverse rotation, and using the dust collection system to collect dust generated by the at least one cutting wheel being pushed away from the user.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to power tools, and more particularly to cut-off saws with one or more blades capable of being operated in both forward and reverse directions. The cut-off saws may also be capable of being used for both dry cutting and/or wet cutting to be used in combination with a fluid distribution system and/or a dust collection system. A cutting wheel of the cut off saws can be operated in a forward rotational direction during wet cutting while the removed material gets pulled back into the cut line. In contrast, the cutting wheel of the cut off saws can be operated in a reverse rotational direction during dry cutting while the removed material gets pushed out of and away from the cut line. Optionally, the removed material is directed into a dust collection system. The cut-off saws can be operated in any combination of forward/reverse and wet/dry cutting. Operation of the cut-off saws and rotational direction of the cutting wheels can be controlled using a switching mechanism. The cut-off saws can include or otherwise be coupled to the fluid distribution system and the dust collection system for capturing material as it exits cut line.

Figure 1:
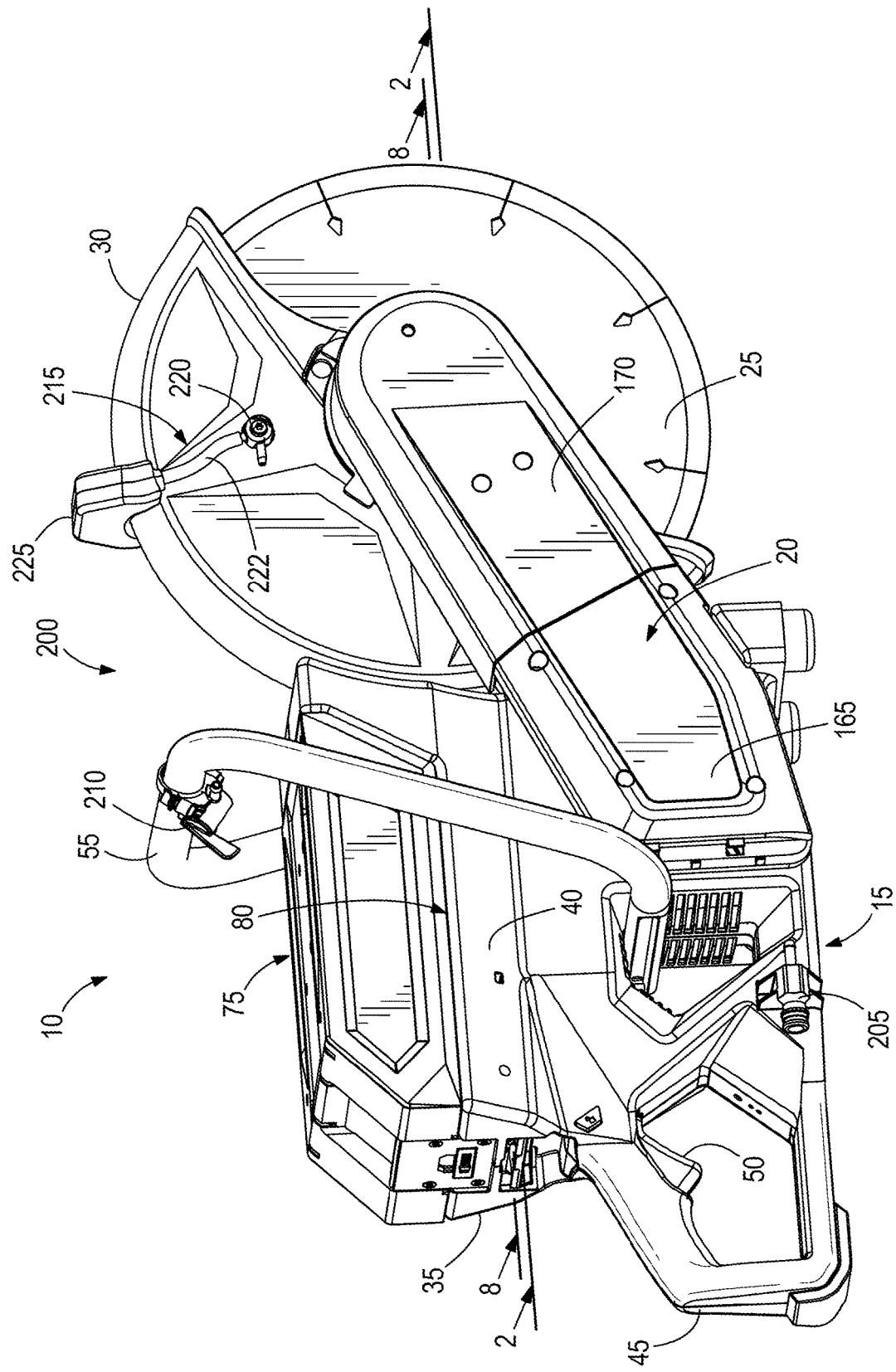
FIG. 1 is a perspective view of a cut-off saw according to an embodiment of the disclosure.

FIG. 1 illustrates a handheld power tool 10, which is a cut-off saw in the illustrated embodiment. The saw 10 includes a housing 15, a support arm 20 coupled to and extending from the housing 15, a cutting wheel 25 carried by the support arm 20, and a guard 30 covering a portion of the circumference of the cutting wheel 25. The cutting wheel 25 can be a blade, an abrasive disk, or any other rotatable element capable of removing material from a workpiece. In the illustrated embodiment, the cutting wheel 25 has a diameter of at least 9 inches and is preferably 14 inches in diameter. In other embodiments, the cutting wheel 25 can be between about 9 inches and about 16 inches in diameter. In some embodiments, the cutting wheel 25 is configured for bidirectional cutting. In other embodiments, the cutting wheel can be removable for being switched between forward cutting and reverse cutting.

Continuing with FIG. 1, the illustrated housing 15 is a clamshell housing having left and right cooperating halves 35, 40. A first or rear handle 45 extends from a rear portion of the housing 15 in a direction generally opposite the support arm 20. A trigger 50 for operating the saw 10 is located on the rear handle 45. In some embodiments, the trigger 50 can provide an activation mechanism for powering on the saw 10, as well as controlling the directional output of the cutting wheel 25. For example, the trigger 50 can include a first actuation for a forward cutting direction and a second actuation for a second cutting direction. In some embodiments, a separate mechanism can be used in coordination with the trigger 50 to control the cutting direction of the saw 10. For example, the saw can include a separate toggle or switch 52 (see FIG. 4) to control the direction of the cutting wheel 25, as discussed in greater detail herein. In the illustrated embodiment, the saw 10 also includes a second or forward handle 55 that wraps around an upper portion of the housing 15. The forward handle 55 and the rear handle 45 provide grip areas to facilitate two-handed operation of the saw 10.

Figure 2:
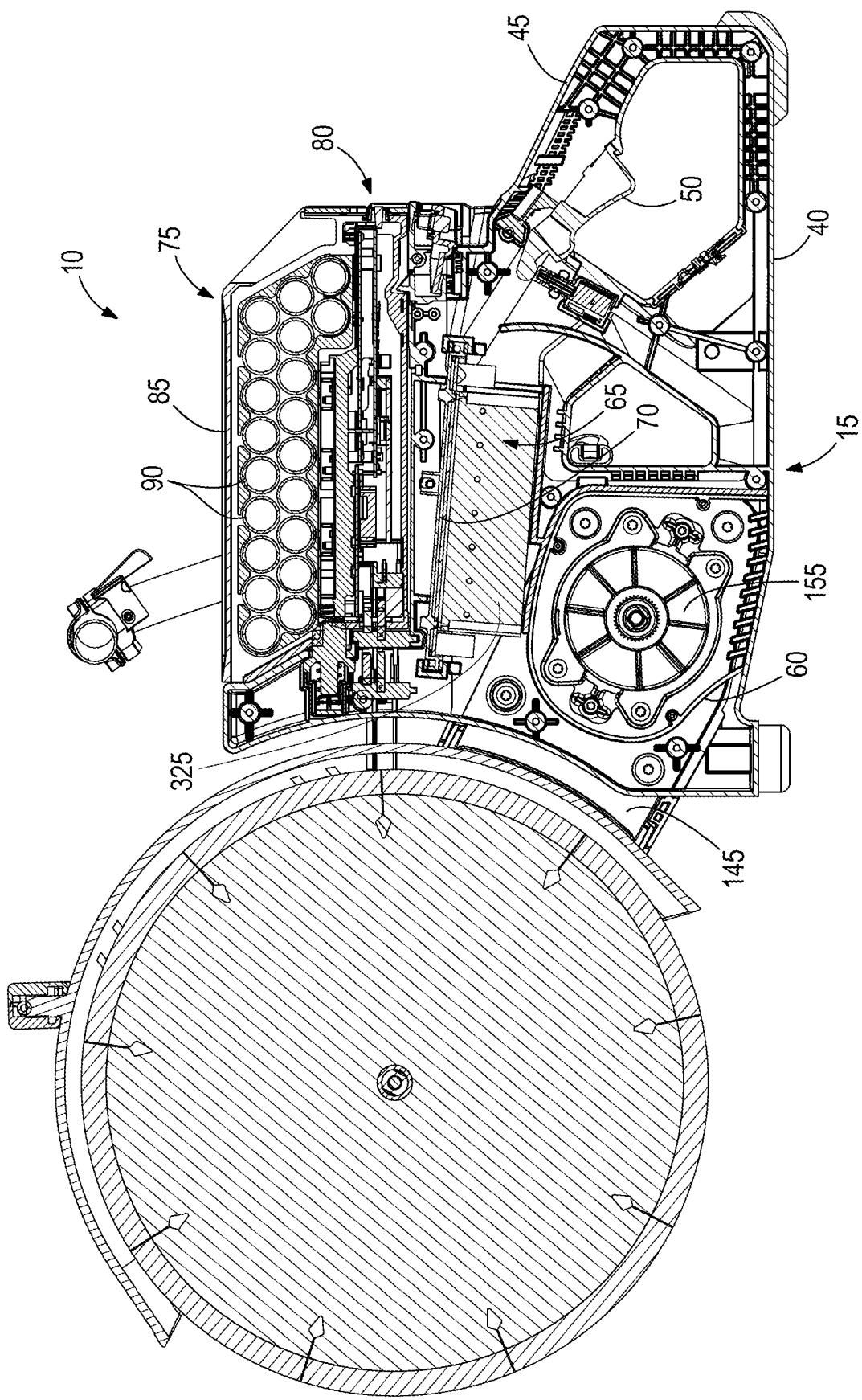
FIG. 2 is a cross-sectional view of the saw of FIG. 1, taken along line 2-2 in FIG. 1.

Referring to FIG. 2, the saw 10 further includes a motor housing 60 formed within the housing 15 at a front, lower portion of the housing 15. An electric motor (see FIG. 4) is mounted in the motor housing 60. The motor is preferably a brushless direct-current ("BLDC") motor. Operation of the motor is governed by a motor control system 65 including a printed circuit board ("PCB") 70. In some embodiments, the motor control system 65 can be coupled to the switch 52 to receive a signal for operating the motor in a forward direction or a reverse direction. The switch 52 can include any combination of switch types, switch mechanisms, locations, etc. without departing from the scope of the present invention. Based on the signaled direction, the motor control system 65 will modify the directional rotation of the motor.

With reference to FIGS. 1 and 2, the illustrated saw 10 is a cordless electric saw and includes a battery pack 75 that provides power to the motor. The battery pack 75 is removably coupled to a battery pack receptacle 80, which is located on the upper portion of the housing 15 in the illustrated embodiment (FIG. 1). As such, the forward handle 55 at least partially surrounds the battery pack receptacle 80 and the battery pack 75, when the battery pack 75 is coupled to the battery pack receptacle 80. The illustrated battery pack 75 is a power tool battery pack and includes a battery pack housing 85 and a plurality of rechargeable battery cells 90 (see FIG. 2) disposed within the battery pack housing 85. The battery cells 90 are lithium-based battery cells but can alternatively have any other suitable chemistry. In the illustrated embodiment, the battery pack 75 has a nominal output voltage of about 80V. In other embodiments, the battery pack 75 can have a different nominal voltage, such as, for example, 36V, 40V, 72V, between 36V and about 80V, or greater than 40V. In other embodiments, the saw 10 may be a corded electric saw configured to receive power from a wall outlet or other remote power source.

The saw 10 includes a drive assembly 100 located within the housing and connected to an output of the motor, for example, at a first end. The drive assembly 100 is also coupled to the at least one cutting wheel 25, for example, at a second end. The drive assembly 100 can transfer rotational force from the motor to the cutting wheel 25. The drive assembly 100 is capable of receiving a rotational force from the motor in either a forward or reverse direction and transfer that rotational force in the forward or reverse direction to the cutting wheel 25 to cause the cutting wheel 25 to rotate in the forward or reverse direction. Alternatively, in some embodiments, the drive assembly 100 can receive a single directional force from a motor and a directional signal (e.g., from switch 52) to translate the single directional force from the motor and in a same direction or in an opposing direction to the cutting wheel 25. In other words, the drive assembly 100 can convert a rotational force from the motor to a forward or reverse direction based on a signal received from the switch 52. For example, the drive assembly 100 can have a transmission to convert a force received from the motor to a forward or reverse directional force being applied to the cutting wheel 25.

Activation and/or direction of the drive assembly 100 can be controlled by the switch 52. In some embodiment, the switch 52 can be configured to control activation of the motor for directional rotation of the drive assembly in either a forward rotational direction or a reverse rotational direction. The drive assembly 100 can include any combination of drive systems. For example, the drive assembly 100 can be a direct drive, a belt drive, transmission drive, etc., or a combination thereof.

Figure 3:
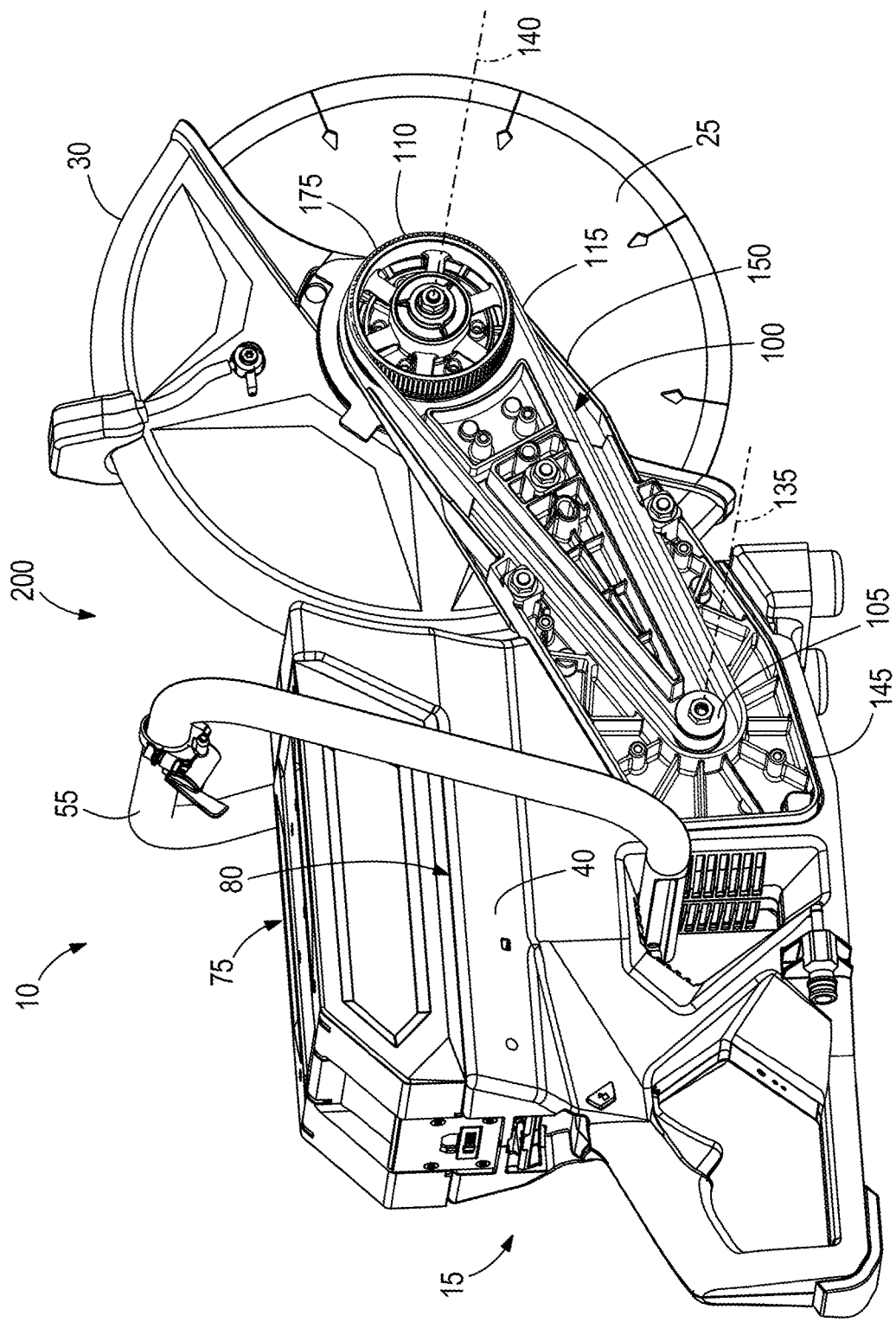
FIG. 3 is a perspective view of the saw of FIG. 1, illustrating a drive train of the saw.

Referring to FIG. 3, an example drive assembly 100 is illustrated. The drive assembly 100, in FIG. 3, includes a drive pulley 105 fixed to an output shaft (not shown) of the motor, a driven pulley 110 connected to the drive pulley 105 by a belt 115, a spindle 120 fixed to the driven pulley 110, and a clamp assembly 125 coupled to the spindle 120. In some embodiments, a clutch mechanism may be provided between the output shaft and the drive pulley 105 to selectively interrupt torque transfer between the output shaft and the drive pulley 105. The clamp assembly 125 includes clamping disks 130a, 130b that hold the cutting wheel 25.

With reference to FIGS. 1-3, the drive pulley 105 defines a first rotational axis 135, and the driven pulley 110 defines a second rotational axis 140 spaced from the first rotational axis (see FIG. 3). The support arm 20 includes a first arm portion 145 coupled to the housing 15 and a second arm portion 150 coupled to the first arm portion 145. In the illustrated embodiment, the first arm portion 145 includes a mount 155 to which the motor is directly fastened (see FIG. 2). The output shaft of the motor extends through the first arm portion 145 to the drive pulley 105 (see FIG. 3). The spindle 120 extends through the second arm portion 150 and is supported by two bearings. The driven pulley 110 and the clamp assembly 125 are located on opposite sides of the second arm portion 150. In the illustrated embodiment, first and second covers 165, 170 (see FIG. 1) are secured to the first and second arm portions 145, 150 to enclose the drive assembly 100 during ordinary operation. The covers 165, 170 are coupled to the respective arm portions 145, 150 by screws, but can be attached via a snap fit or any other suitable manner in other embodiments.

With reference to FIG. 3, the belt 115 is a synchronous belt having a plurality of teeth (not shown) engageable with corresponding teeth 175 on the driven pulley 110 and the drive pulley 105. The toothed engagement between the synchronous belt 115 and the pulleys 105, 110 prevents the belt 115 from slipping under high loads as may occur with a v-belt. In addition, the relatively flat profile of the synchronous belt 115 allows the drive pulley 105 to be smaller in diameter when compared with a v-belt configuration. As such, a higher reduction can be achieved between the drive pulley 105 and the driven pulley 110. For example, in some embodiments, the drive pulley 105 and the driven pulley 110 may be sized to provide a 4:1 reduction from the motor output shaft to a spindle. In other embodiments, the drive pulley 105 and the driven pulley 110 may be sized to provide between a 3:1 and a 5:1 reduction from the motor output shaft to the spindle.

This relatively high reduction ratio advantageously eliminates the need for a separate gearbox or gear reduction stage between the motor output shaft and the drive pulley 105, thereby improving mechanical efficiency and reducing the size, cost, and weight of the drive assembly 100. In the illustrated embodiment, the drive assembly 100 has a mechanical efficiency (i.e., a ratio of power at the spindle to power at the output shaft of the motor) between about 95 percent and about 98 percent. In contrast, a drive assembly requiring a gearbox may have a mechanical efficiency of only about 92 percent or less. The relatively high reduction ratio also can allow the motor to spin at a higher rate compared to v-belt and direct drive configurations, which can improve cooling and performance. In some embodiments, the motor has a maximum output speed greater than 10,000 RPM. In other embodiments, the motor has a maximum output speed between about 10,000 RPM and about 30,000 RPM. In the illustrated embodiment, the motor has a maximum output speed of about 20,000 RPM. Finally, the synchronous belt 115 advantageously does not require tensioning. Accordingly, the saw 10 need not include means for adjusting the tension of the belt 115, which reduces the weight, complexity, and cost of the drive assembly 100. In addition, the saw's performance will stay relatively consistent over the lifetime of the belt 115. In contrast, v-belts typically stretch after a period of ordinary operation and must be manually or automatically tensioned from time to time to prevent slippage.

The drive assembly 100 discussed with respect to FIG. 3 is provide as an example drive assembly 100 that could be implemented with the present invention, however, the saw 10 is not intended to be limited to only the example drive assemblies 100 provided herein. The drive assembly 100 can include any combination of drive assemblies capable of driving a cutting wheel 25 in two rotational directions.

Referring back to FIG. 1, the illustrated saw 10 further includes a fluid distribution system 200. The fluid distribution system 200 includes a connector 205 coupled to the lower portion of the housing 15, a control valve 210 coupled to the forward handle 55, and a distributor 215 coupled to the guard 30. A supply line (not shown) can be attached to the connector 205 to provide fluid such as water to the fluid distribution system 200 from an external source (not shown). A first line (not shown) extends from the connector 205 to the control valve 210, and a second line (not shown) extends from the control valve 210 to the distributor 215. In the illustrated embodiment, the distributor 215 includes a pair of spray nozzles 220 disposed on opposite sides of the guard 30 connected by a supply line 222. The spray nozzles 220 are operable to discharge fluid onto each side of the cutting wheel 25 for cooling, lubrication, and dust abatement. In the illustrated embodiment, an auxiliary handle 225 is attached to the guard 30 through which a portion of the supply line 222 extends that can be grasped by a user to facilitate adjusting an angular position of the guard 30. However, the handle 225 may alternatively be located elsewhere on the guard 30 remote from the supply line 222. The fluid distribution system 200 can include any combination of fluid distribution systems capable of delivering fluid to a cutting wheel 25 for wet cutting and is not intended to be limited to the fluid distribution system 200 discussed herein.

Figure 4:
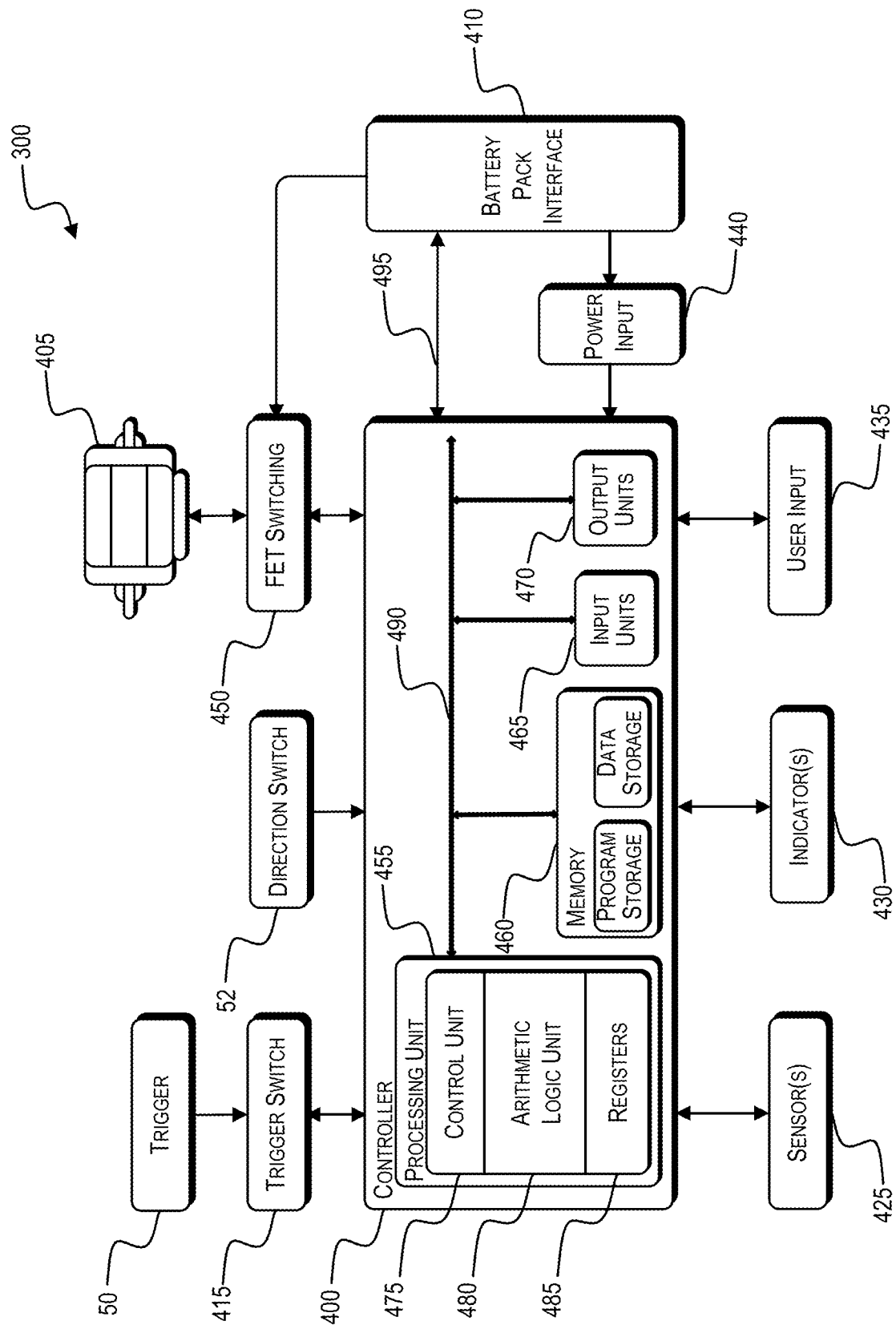
FIG. 4 illustrates a control system for the device of FIGS. 1-3, according to embodiments described herein.

FIG. 4 illustrates a control system 300 for the saw 10. The control system can be part of or otherwise connected to the printed circuit board ("PCB") 70 and can include a controller 400. The controller 400 is electrically and/or communicatively connected to a variety of modules or components of the saw 10. For example, the illustrated controller 400 is electrically connected to a motor 405, a battery pack interface 410 (connectable to the battery pack 75 via battery pack receptacle 80), a trigger switch 415 (connected to the trigger 50), the direction switch 52, one or more sensors or sensing circuits 425, one or more indicators 430, a user input module 435, a power input module 440, and a FET switching module 450 (e.g., including a plurality of switching FETs). The controller 400 includes combinations of hardware and software that are operable to, among other things, control the operation of the saw 10, monitor the operation of the saw 10, activate the one or more indicators 430 (e.g., an LED), etc.

The controller 400 includes a plurality of electrical and electronic components that provide power, operational control, and protection to the components and modules within the controller 400 and/or the saw 10. For example, the controller 400 includes, among other things, a processing unit 455 (e.g., a microprocessor, a microcontroller, electronic process, electronic controller, or another suitable programmable device), a memory 460, input units 465, and output units 470. The processing unit 455 includes, among other things, a control unit 475, an arithmetic logic unit ("ALU") 480, and a plurality of registers 485 (shown as a group of registers in FIG. 4), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 4 for illustrative purposes. The use of one or more control and/or data buses for the interconnection between and communication among the various modules, circuits, and components would be known to a person skilled in the art in view of the embodiments described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the saw 10 can be stored in the memory 460 of the controller 400. The software includes, for example, firmware, one or more applications, program data, filters, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The battery pack interface 410 includes a combination of mechanical components (e.g., rails, grooves, latches, etc.) and electrical components (e.g., one or more terminals) configured to and operable for interfacing (e.g., mechanically, electrically, and communicatively connecting) the saw 10 with a battery pack (e.g., the battery pack 75). For example, power provided by the battery pack 75 to the saw 10 is provided through the battery pack interface 410 to the power input module 440. The power input module 440 includes combinations of active and passive components to regulate or control the power received from the battery pack 75 prior to power being provided to the controller 400. The battery pack interface 410 also supplies power to the FET switching module 450 to be switched by the switching FETs to selectively provide power to the motor 405. The battery pack interface 410 also includes, for example, a communication line 495 for provided a communication line or link between the controller 400 and the battery pack 75.

The indicators 430 include, for example, one or more light-emitting diodes ("LEDs"). The indicators 430 can be configured to display conditions of, or information associated with, the saw 10. For example, the indicators 430 are configured to indicate measured electrical characteristics of the saw 10, the status of the fluid distribution system 200, etc. The user input module 435 is operably coupled to the controller 400 to, for example, select a forward mode of operation or a reverse mode of operation, a torque and/or speed setting for the saw 10 (e.g., using torque and/or speed switches), etc. In some embodiments, the user input module 435 includes a combination of digital and analog input or output devices required to achieve a desired level of operation for the saw 10, such as one or more knobs, one or more dials, one or more switches, one or more buttons, etc.

The controller 400 is configured to determine whether a fault condition of the saw 10 is present and generate one or more control signals related to the fault condition. For example, the sensors 425 include one or more current sensors, one or more speed sensors, one or more Hall Effect sensors, one or more temperature sensors, etc. The controller 400 calculates or includes, within memory 460, predetermined operational threshold values and limits for operation of the saw 10. For example, when a potential thermal failure (e.g., of a FET, the motor 405, etc.) is detected or predicted by the controller 400, power to the motor 405 can be limited or interrupted until the potential for thermal failure is reduced. If the controller 400 detects one or more such fault conditions of the saw 10 or determines that a fault condition of the saw 10 no longer exists, the controller 400 is configured to provide information and/or control signals to another component of the battery pack 75 (e.g. the battery pack interface 410, the indicators 430, etc.).

Figure 5:
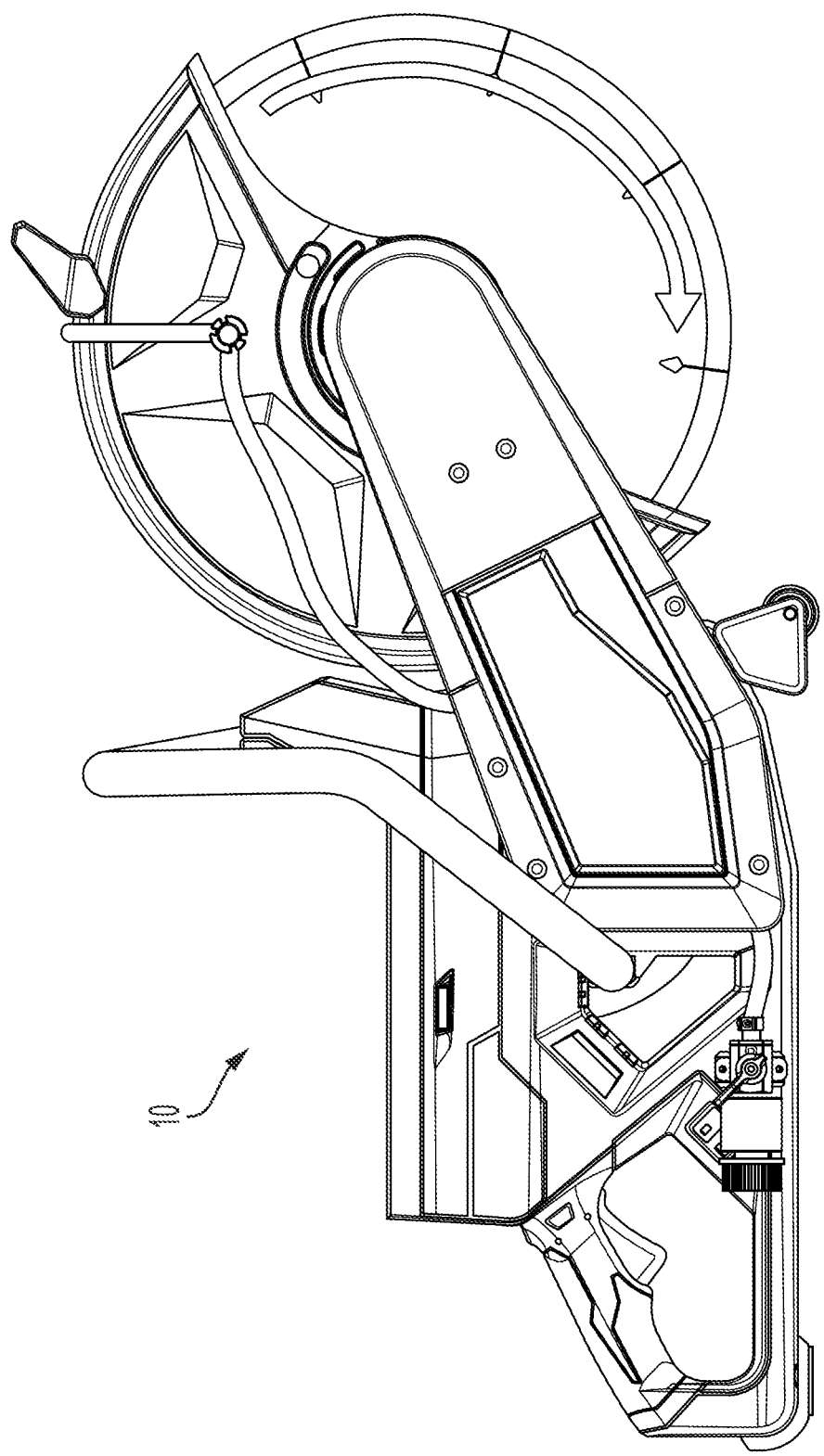
FIG. 5 is a side view of a cut-off saw showing a forward blade operation, according to an embodiment of the disclosure.
Figure 6:
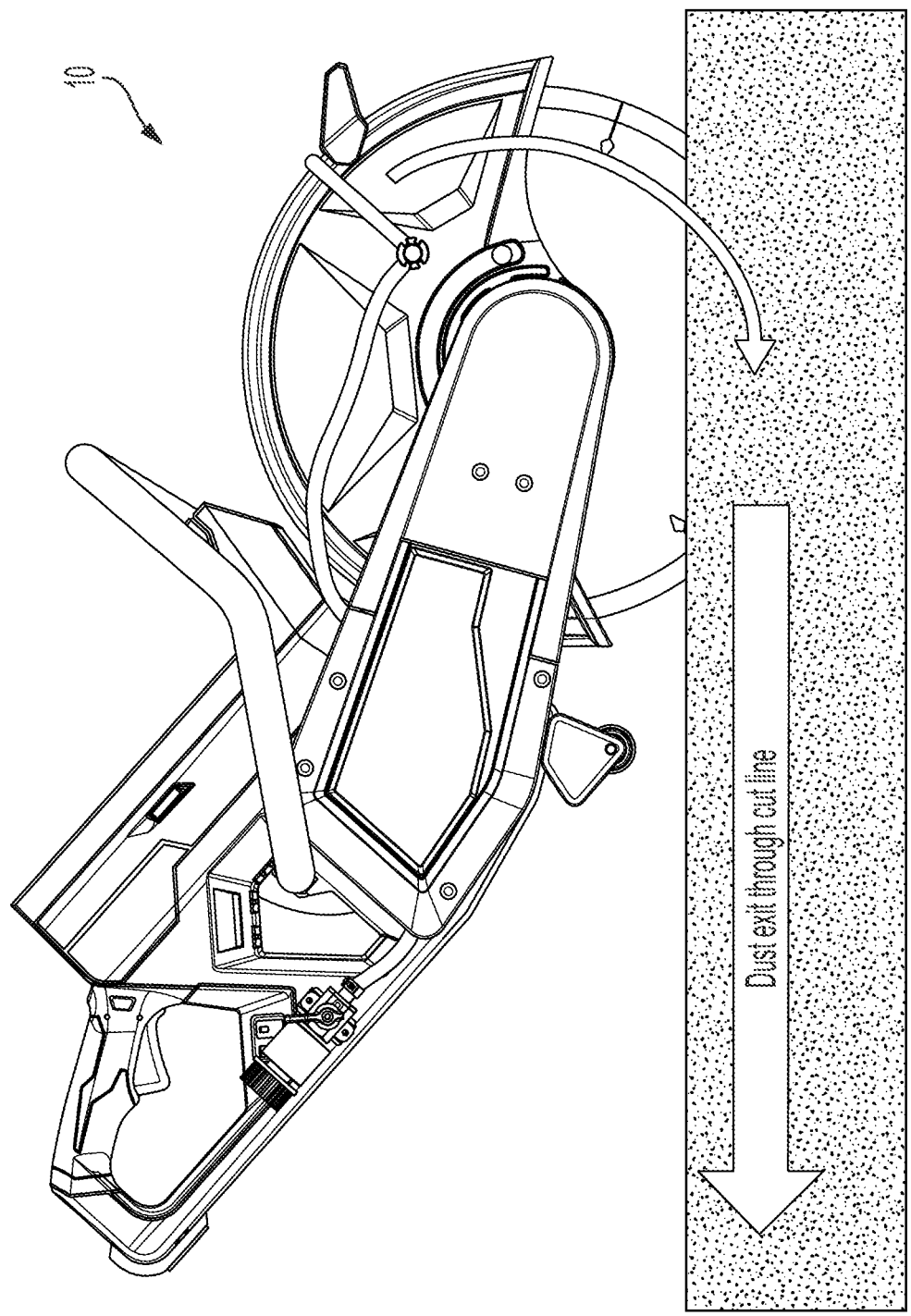
FIG. 6 is a side view of a cut-off saw showing a forward blade operation, according to an embodiment of the disclosure.
Figure 7:
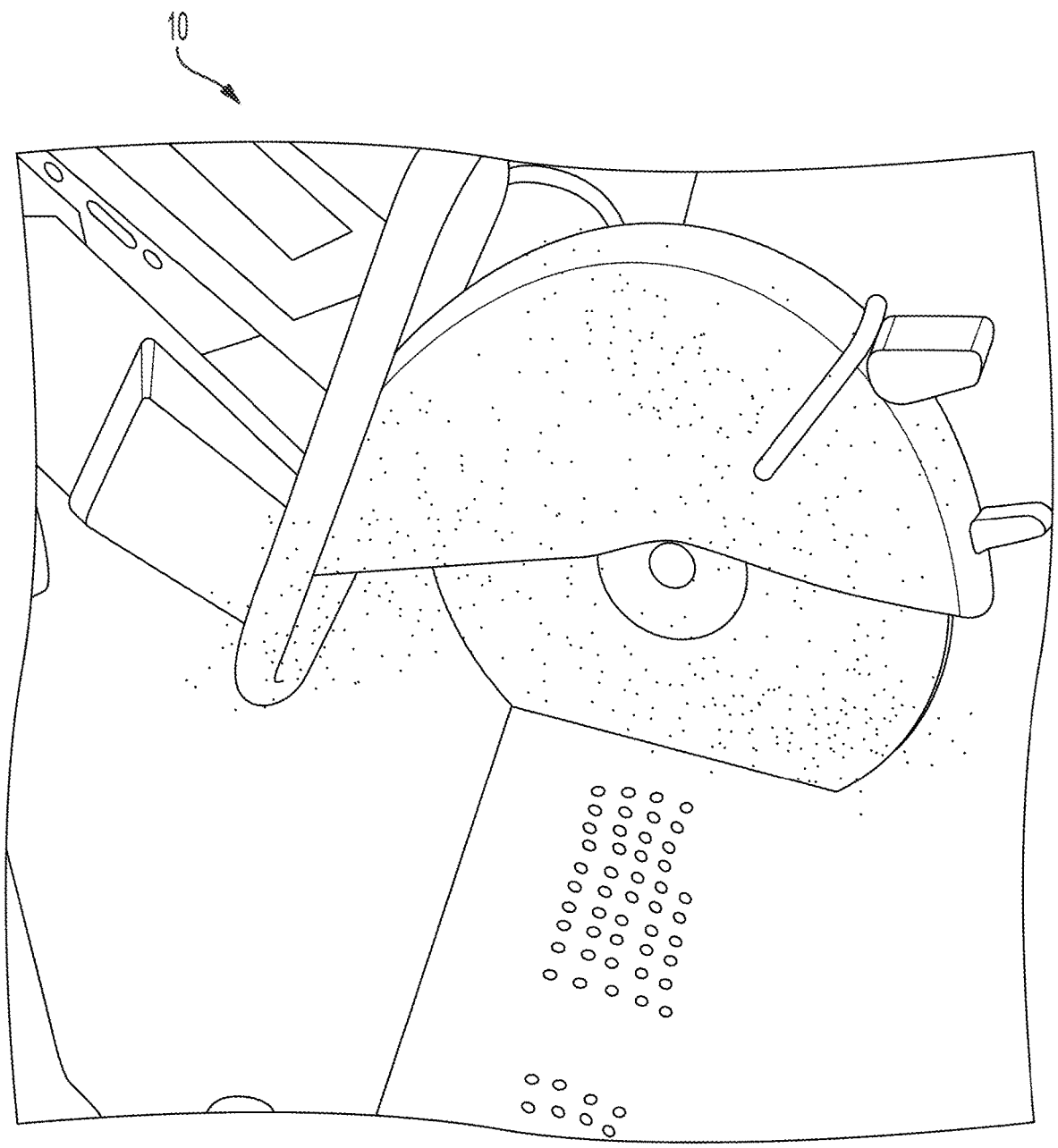
FIG. 7 is a side view of a cut-off saw showing a forward blade operation, according to an embodiment of the disclosure.

FIGS. 5-7 illustrate an example rotation of the cutting wheel 25 during "forward" operation of the saw 10. As shown in FIGS. 5 and 6, forward operation can include the top of the cutting wheel 25 rotating away from a user holding the saw 10 (i.e., when viewing a top portion of the blade), such that the saw "climbs" through material during cutting. When applying the cutting wheel 25 against a surface during forward operation, removed material can be pulled back into the cut line. For example, when cutting concrete, the removed concrete material can get pulled toward the user and into the cut line within the surface, as shown in FIGS. 6 and 7. As shown in FIG. 7, when cutting in the forward rotational direction, the dust may hit against the body of the tool and swirl randomly. In some embodiments, it may be preferable to operate the saw 10 with the fluid distribution system 200, as discussed with respect to FIGS. 1-3, for wet cutting. In some embodiments, the forward rotational direction would be preferred for wet cutting so the fluid (e.g., water) tracks out of the cut towards the user rather than being thrown up into the guard 30 of the saw 10. The forward rotational direction operation of the saw 10 will also assist the user during cutting as the saw 10 pulls itself forward when penetrating a cutting surface.

Figure 8:
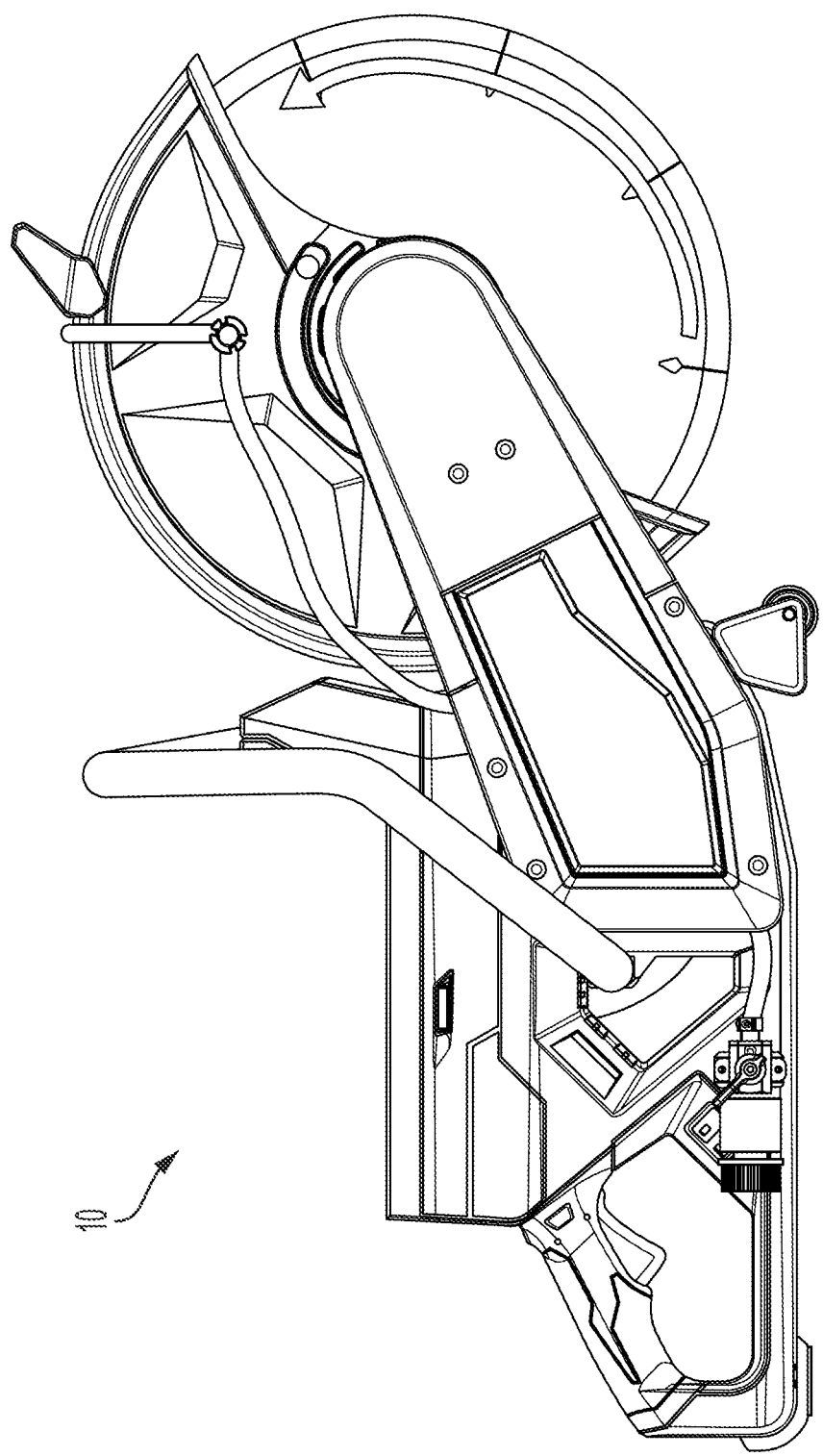
FIG. 8 is a side view of a cut-off saw showing a reverse blade operation, according to an embodiment of the disclosure.
Figure 9:
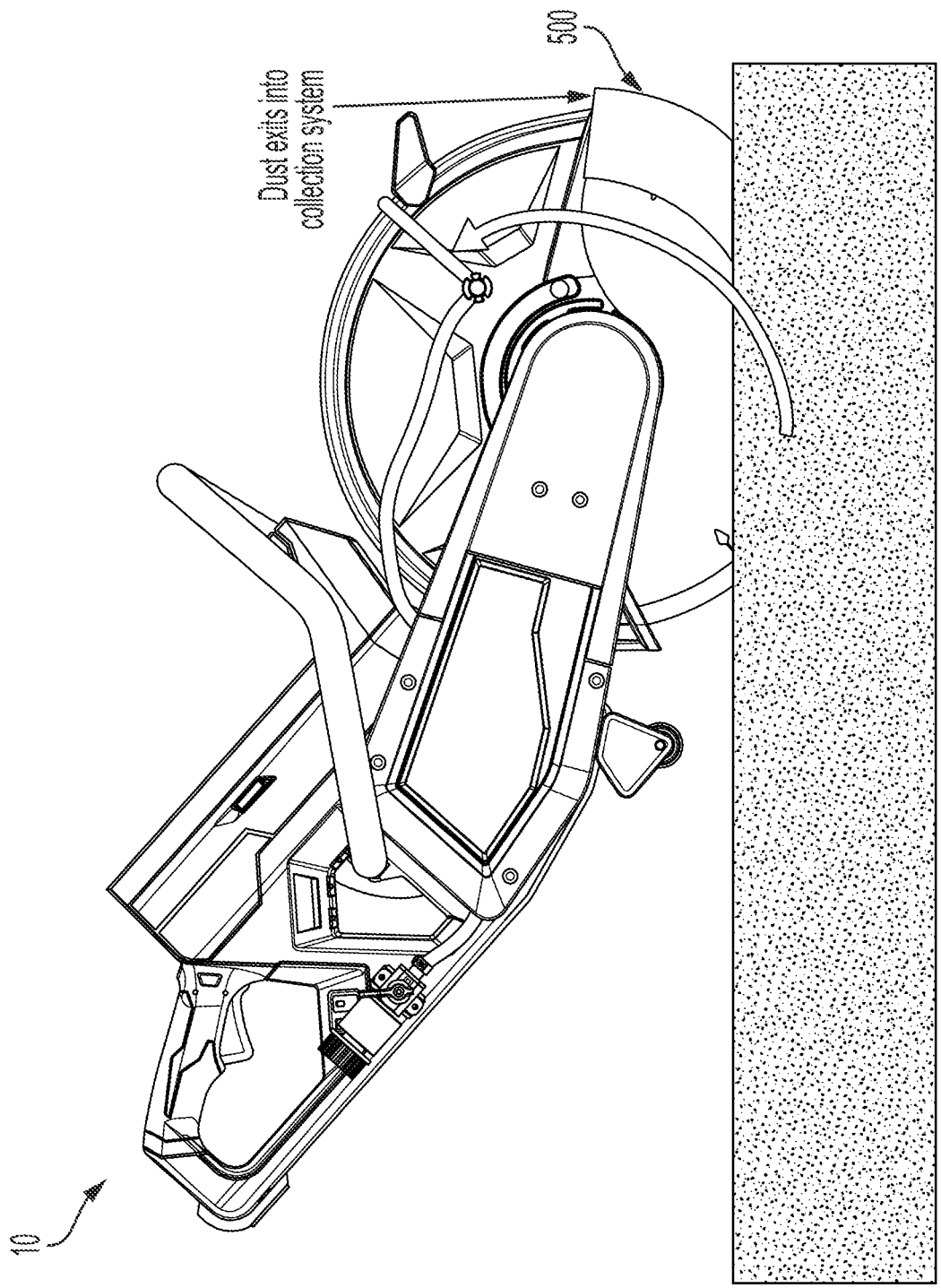
FIG. 9 is a side view of a cut-off saw showing a reverse blade operation, according to an embodiment of the disclosure.
Figure 10:
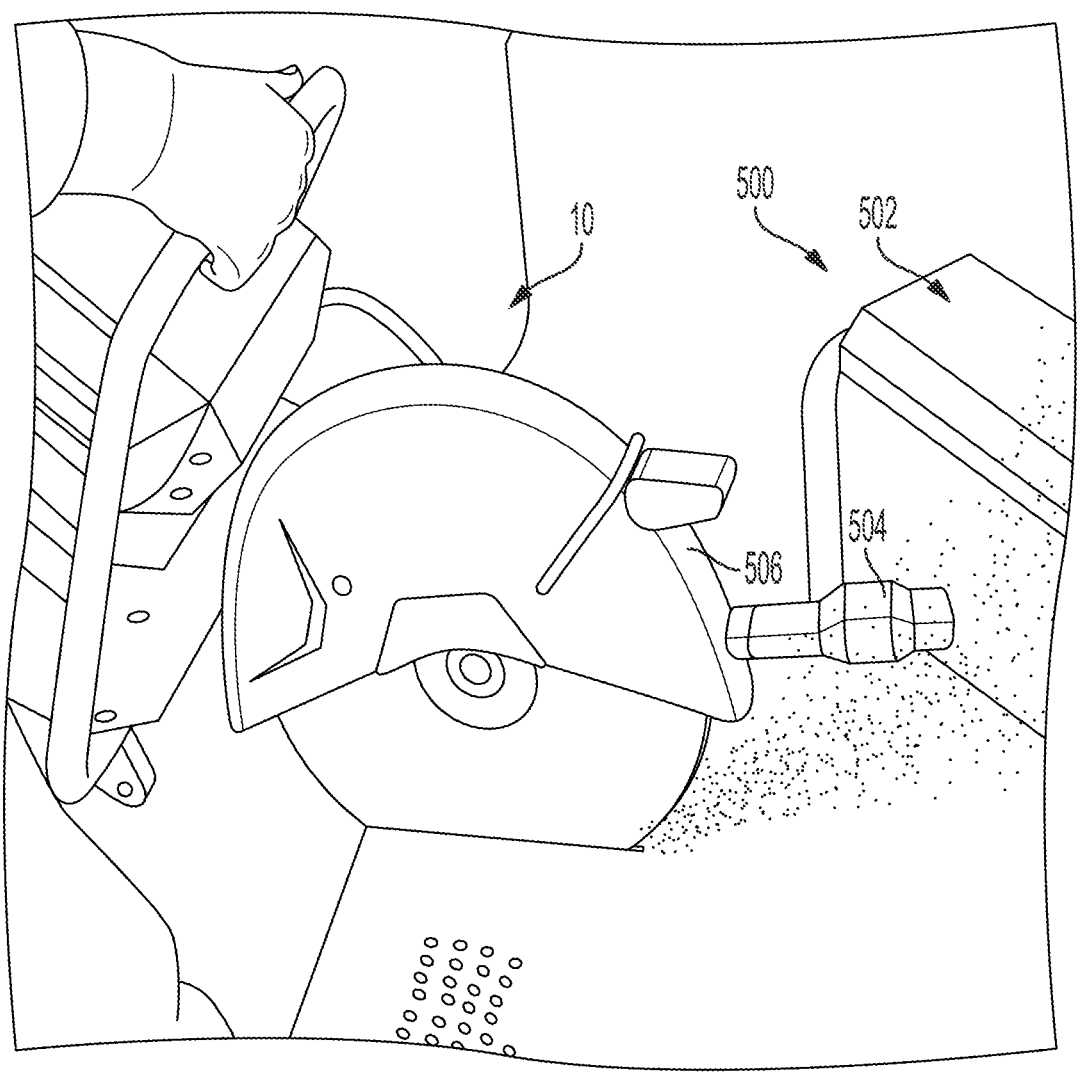
FIG. 10 is a side view of a cut-off saw showing a reverse blade operation, according to an embodiment of the disclosure.

FIGS. 8-10 illustrate an example rotation of the cutting wheel 25 during "reverse" operation of the saw 10. As shown in FIGS. 8 and 9, reverse operation can include the top of the cutting wheel 25 rotating toward a user holding the saw 10, such that the saw "pushes" against material of a cutting surface when cutting. During reverse rotation of the cutting wheel 25, removed material can be pushed out and away from the cut line in the cutting surface and the end of the saw 10. For example, when cutting concrete, the removed concrete material can get pushed away from the user, as shown in FIGS. 9 and 10. As shown in FIG. 10, during reverse cutting direction, the dust may exit from the cutting surface in a predictable or controlled stream. In some embodiments, it may be preferable to operate the saw 10 in the reverse rotational direction in combination with a dust collection system 500 for dry cutting.

Referring to FIG. 10, in some embodiments, the saw 10 can include a coupler for attaching a dust collection system 500 to assist in removing dust created by the cutting wheel 25 operating in reverse. The dust collection system 500 can include any combination of dust collection systems capable of creating a suction or vacuum force to remove dust from an area. In some embodiments, the dust collection system 500 can include a vacuum 502, a hose 504, and a coupling mechanism 506 for attachment to the saw 10. For example, the guard 30 of the saw 10 can include a coupler for connecting a vacuum hose 504 to the saw 10, such that as dust is pushed away from the saw 10 operating in reverse, the vacuum 502 can collect the dust. The coupler on the saw 10, for attaching the dust collection system 500, can be provided at any number of points on the saw 10 and is not limited to being on the cover 30. For example, the coupler for connecting to the dust collection system 500 can be located on any combination of a front, rear, side, top, bottom, etc., of the saw 10. For example, referring to FIG. 9, a dust collection system 500 can be coupled to the front end of the cutting wheel 25 extending from or substantially adjacent to the cover 30. The dust collection system 500 can include any combination of dust collection systems 500 capable of removing dust created by a cutting wheel 25 and is not intended to be limited to the dust collection system 500 discussed herein.

When using the saw 10 in the reverse rotational direction, along with the dust collection system 500, it can help reduce the amount of airborne dust that is generated during cutting because the dust would exit in a more controlled manner as the dust is pushed away from the working end of the saw 10. Additionally, operating the saw 10 in reverse may cause dust exiting the front of the saw 10 such that a user can walk forward when cutting to control the exact location the dust exits to be picked up and/or collected. In some embodiments, regardless of the rotational direction of the motor 405 for cutting wheel 25, and, for example, using the fluid distribution system 200 (e.g., wet cutting in the forward rotational direction) or the dust collection system 500 (e.g., dry cutting in the reverse rotational direction), a concentration of airborne respirable crystalline silica over an 8 hour total weight average ("TWA") is 25 micro-grams per meter cubed ("$\mu g/m^3$") or less.

In operation, the saw 10 can be configured to transition between a forward rotation of the cutting wheel 25 and a reverse rotation of the cutting wheel 25 based on selection/activation of the direction switch 52. The direction switch 52 can include any combination of activation/transition mechanisms, for example, a switch, button, actuator, level, etc. In one embodiment, the switch 52 can be a user operated switch or toggle configured to control the directional rotation of the motor 405 and/or drive assembly 100 based on the output of the motor 405. For example, the switch 52 can be a slidable actuator from a first position or state for forward operation to a second position or state for reverse operation. Similarly, the saw 10 can default to one of forward or reverse rotation and the switch 52 can toggle the saw 10 to operate in an opposing direction.

In another embodiment, the switch 52 can be an automatic switch that is activated in response to a sensor 425 detecting one or more conditions of the saw 10. For example, the switch 52 can be a fluid (e.g., water) supply detection switch configured to control the directional rotation of the drive assembly based on a detected presence of a fluid supply such that the switch 52 will cause the motor 405 and/or drive assembly 100 to operate in the forward rotational direction. In some embodiments, when a dust collection system 500 is detected by a sensor 425, the motor 405 and/or drive assembly 100 is configured to be controlled to operate in the reverse rotational direction. The use of a fluid supply detection switch can be configured to detect the presence of a fluid supply based on the saw 10 being connected to the fluid distribution system 200 (e.g., a pressure sensor) and/or detecting the presence of water or moisture (e.g., a water detection sensor) near the cutting wheel 25. Any combination of automated switches and/or sensors can be used without departing from the scope of the present disclosure. For example, the switch 52 can be coupled to any combination of a motion sensor, a pressure sensor, a gyroscopic sensor, etc. In instances where an automatic switch is present, there may be another switch or button (e.g., user input 435) for the user to override the automated direction selection to a direction that the user prefers.

Figure 11:
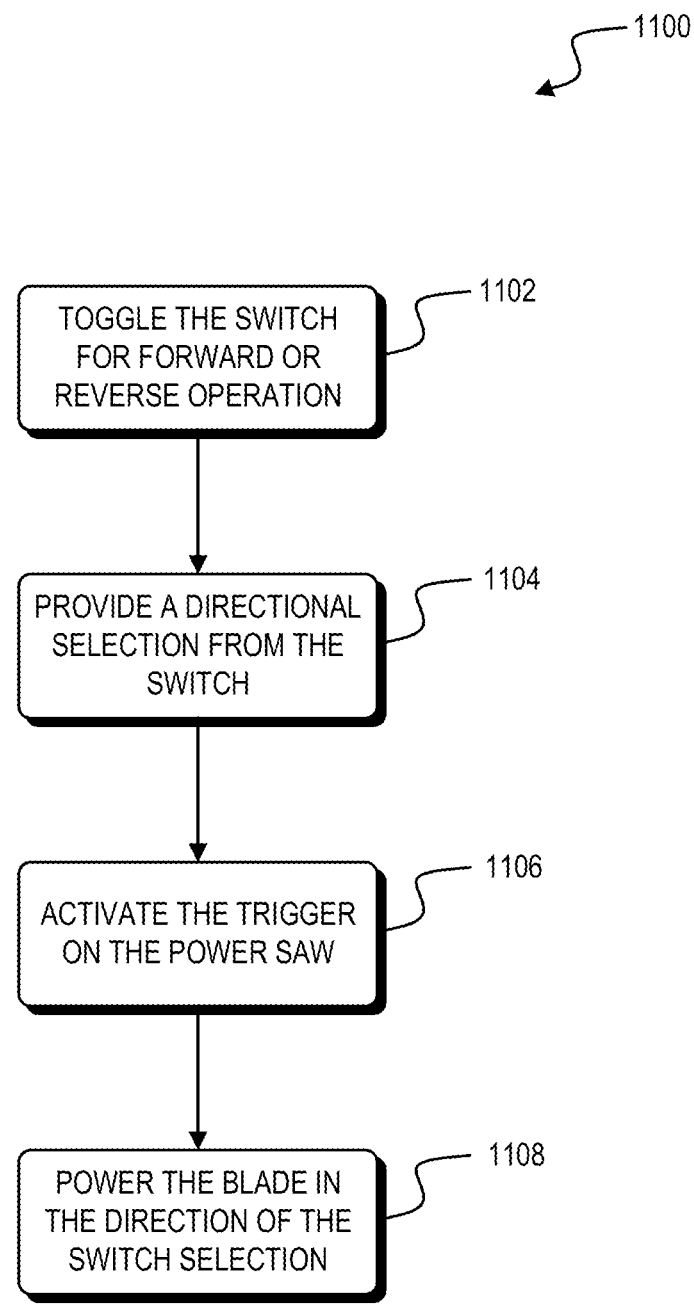
FIG. 11 is a flowchart showing operation of a cut-off saw, according to an embodiment of the disclosure.

FIG. 11 illustrates a flowchart 1100 illustrating an example operation for controlling forward and reverse operation of the saw 10. The flowchart 1100 depicts an example operation of the saw 10 having a manually operated switch for selecting a rotational direction of the cutting wheel 25. At step 1102, the user can toggle the switch 52 for either forward or reverse operation. As discussed herein, the user can make the directional selection using any combination of switching mechanisms. At step 1104 the selection can be provided from the switch 52 to the controller 400 for controlling the motor 405 and/or drive assembly 100. The switch 52 selection can be used to control the motor 405 and/or drive assembly 100 using the controller 400 and any combination or electromechanical systems. For example, a directional control signal can be provided by the controller 400 to the motor 405 through the FET switching assembly 450 to designate a directional output provided by the motor 405 and/or drive assembly 100.

At step 1106 the user can activate the trigger 50 for the saw 10. The trigger 50 selection can be provided to controller 400 for controlling the motor 405 and/or drive assembly 100 using any combination or electromechanical systems. For example, an activation control signal can be provided by the controller 400 to the motor 405 through the FET switching module 450. At step 1108 a rotational force is applied to the cutting wheel 25 in the selected direction. The direction of the cutting wheel 25 can be controlled by the combination of the controller 400, the FET switching module 450, the motor 405, and the drive assembly 100. Based on the selection of the switch 52, the motor 405 itself can provide the rotational force in the selected direction or the drive assembly 100 can modify (e.g., via a transmission) the force applied by the motor to translate the rotational force provided to the cutting wheel 25 into the selected rotational direction. For example, if the forward direction was selected, the signal provided by the switch 52 can cause the motor 405 to provide rotational force in the forward direction to the cutting wheel 25, upon activation of the trigger 50.

Figure 12:
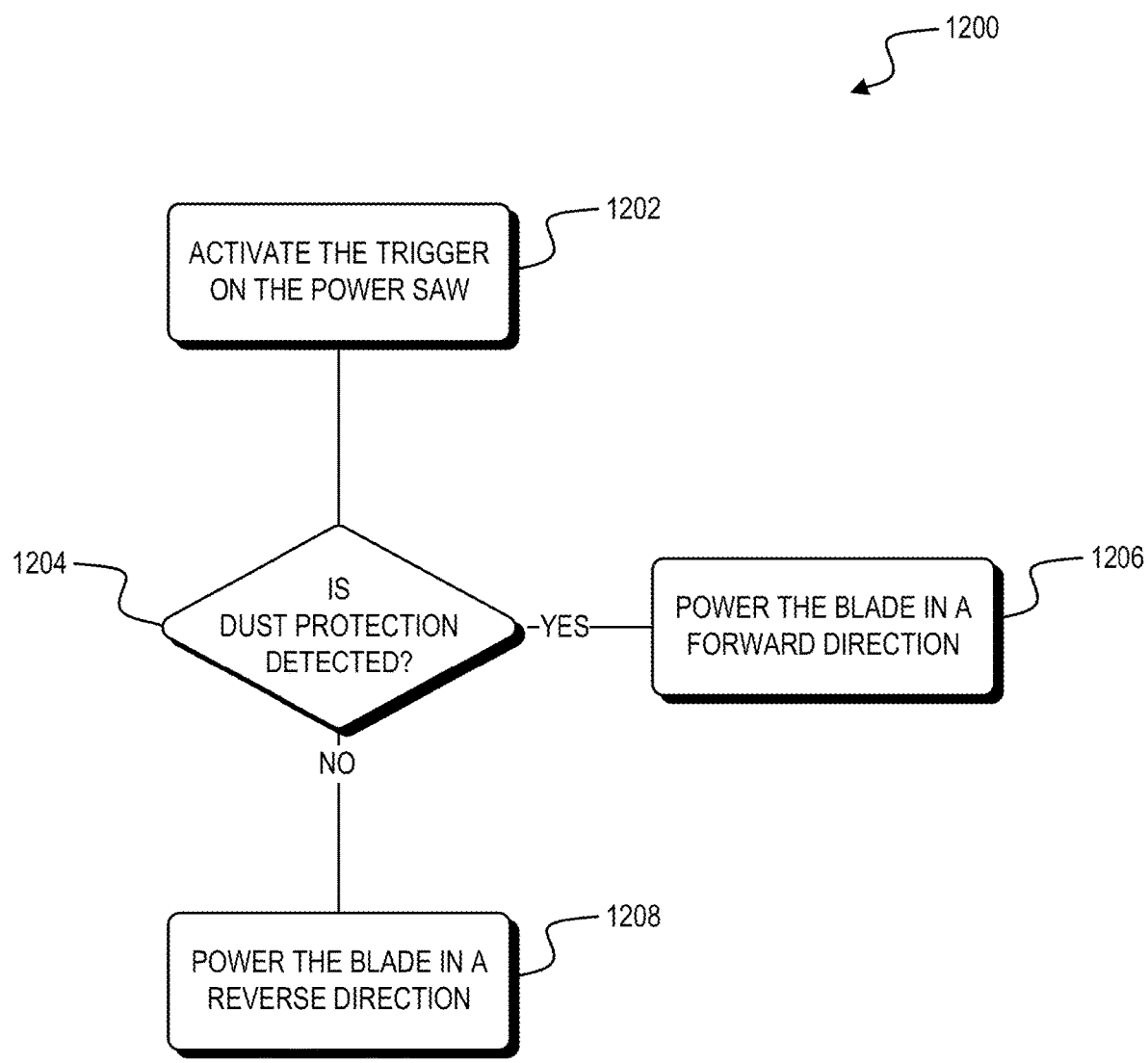
FIG. 12 is a flowchart showing operation of a cut-off saw, according to an embodiment of the disclosure.

FIG. 12 illustrates a process 1200 illustrating an example operation for controlling forward and reverse operation of the saw 10. The process 1200 depicts an example operation of the saw 10 having an automatically triggered switch for selecting a rotational direction of the cutting wheel 25. At step 1202, the user can activate the trigger 50 for the saw 10. The trigger 50 selection can be provided to the controller 400 to control the motor 405 and drive assembly 100 using any combination or electromechanical systems. For example, an activation control signal can be provided by the controller 400 to the motor 405 through the FET switching module 450. At step 1204 the saw 10 (e.g., controller 400) can check to see if the presence of a fluid supply is detected. For example, a sensor 425 can be a fluid supply detection sensor configured to detect the presence of a fluid supply or fluid distribution system connected to the saw (e.g., the fluid distribution system 200) and/or detect the presence of a fluid such as water or moisture near the cutting wheel 25. A dust collection system 500 can similarly be detected using a sensor 425. If the presence of fluid and/or a fluid supply is detected, the process 1200 will advance to step 1206, otherwise if no fluid supply is detected, the process 1200 will advance to step 1208.

At step 1206, if a fluid supply is detected, the automated switch 52 can configure the saw 10 to power the cutting wheel 25 in a forward rotational direction. For example, the switch 52 can provide the selection of forward operation to the controller 400 to control the motor 405 and/or drive assembly 100. The switch 52 selection can be provided by the controller 400 to the motor 405 or drive assembly 100 using any combination of electromechanical systems. For example, a directional control signal can be provided by the controller 400 to the motor 405 through the FET switching module 450 to designate a directional output provided by the motor 405 and/or drive assembly 100 to the cutting wheel 25. At step 1208, if a fluid supply is not detected, the automated switch 52 can configure the saw 10 to power the cutting wheel 25 in a reverse direction. For example, the switch 52 can provide the selection of the reverse operation to the controller 400 to control the motor 405 and/or drive assembly 100. The switch 52 selection can be provided by the controller 400 to the motor 405 or drive assembly 100 using any combination of electromechanical systems. For example, a directional control signal can be provided by the controller 400 to the motor 405 through the FET switching assembly 450 to designate a directional output provided by the motor 405 and/or drive assembly 100. In some embodiments, detecting the presence of the dust collection system causes the controller 400 to control the motor 405 or drive assembly 100 in the reverse rotational direction.

Regardless of the selected direction, the cutting wheel 25 can be controlled by the combination of the controller 400, FET switching module 450, motor 405, and the drive assembly 100. Based on the selection of the switch 52, the motor 405 itself can provide the rotational force in the selected direction or the drive assembly 100 can be modified (e.g., via a transmission) to translate the rotational force provided by the motor 405 into the selected rotational direction. For example, if the forward direction was selected, the signal provided by the switch 52 can cause the motor 405 to provide rotational force in the forward direction upon activation of the trigger 50.

Although the disclosure has been described in detail with reference to certain preferred embodiments, variations and modifications exist within the scope and spirit of one or more independent aspects of the disclosure as described. Various features and advantages are set forth in the following claims.

What is claimed is:

1. A power tool comprising:
    a housing;
    a first handle and a second handle, the first handle and the second handle configured to facilitate two-handed operation of the power tool;
    a motor located within the housing;
    a drive assembly located within the housing and connected to an output of the motor;
    at least one cutting wheel coupled to the drive assembly;
    at least one switch configured to control activation of the motor for directional rotation of the drive assembly in either a forward rotational direction or a reverse rotational direction;
    a fluid supply coupled to the power tool; and
    a sensor configured to detect a presence of the fluid supply;
    wherein a rotation of the at least one cutting wheel is configured to be automatically switched by the at least one switch to the forward rotational direction based on the presence of the fluid supply.

2. The power tool of claim 1, wherein the drive assembly is configured to operate in the reverse rotational direction during dry cutting.

3. The power tool of claim 1, wherein the drive assembly is configured to operate in the forward rotational direction during wet cutting.

4. The power tool of claim 1, further comprising a dust collection system configured to collect dust created by the at least one cutting wheel cutting a surface.

5. The power tool of claim 1, wherein the at least one switch is a manual switch configured to control the directional rotation of the drive assembly based on the output of the motor.

6. The power tool of claim 1, wherein the power tool is a cut-off saw.

7. The power tool of claim 1, wherein the at least one cutting wheel is configured for bidirectional cutting.

8. The power tool of claim 1, wherein the at least one cutting wheel is one of a blade or an abrasive disk.

9. The power tool of claim 1, wherein a diameter of the cutting wheel is at least 9 inches.

10. The power tool of claim 9, wherein the diameter of the cutting wheel is at least 14 inches.

11. The power tool of claim 1, wherein the cutting wheel has a diameter of between about 9 inches and about 16 inches.

12. The power tool of claim 1, further comprising a guard configured to cover at least a portion of a circumference of the at least one cutting wheel.

13. A system comprising:
a removable and rechargeable battery pack; and
a power tool including:
a housing configured to receive the removable and rechargeable battery pack,
a motor located within the housing,
a drive assembly located within the housing and connected to an output of the motor,
a first handle and a second handle, the first handle and the second handle configured to facilitate two-handed operation of the power tool,
at least one cutting wheel coupled to the drive assembly,
at least one switch configured to control activation of the motor for directional rotation of the drive assembly in either a forward rotational direction or a reverse rotational direction;
a fluid supply coupled to the power tool; and
a sensor configured to detect a presence of the fluid supply;
wherein a rotation of the at least one cutting wheel is configured to be automatically switched by the at least one switch to the forward rotational direction based on the presence of the fluid supply.

14. The system of claim 13, further comprising a dust collection system coupled to the power tool.

15. A method for cutting a surface, the method comprising:
activating a power tool including a housing, a motor located within the housing, a drive assembly located within the housing and connected to an output of the motor, a first handle and a second handle configured to facilitate two-handed operation of the power tool, at least one cutting wheel coupled to the drive assembly, and at least one switch;
controlling activation of the motor for directional rotation of the drive assembly in a forward rotational direction when the at least one switch is in a first state;
coupling a fluid supply to the power tool;
detecting, via a sensor, a presence of the fluid supply, and automatically switching, by the at least one switch, a rotation of the at least one cutting wheel to the forward rotational direction based on the presence of the fluid supply;
controlling activation of the motor for directional rotation of the drive assembly in a reverse rotational direction when the at least one switch is in a second state; and
advancing the power tool toward the surface to cut the surface.

16. The method of claim 15, further comprising:
coupling a dust collection system to the power tool;
switching, by a user input to the at least one switch, a rotation of the at least one cutting wheel to the reverse rotational direction; and
collecting dust generated by the at least one cutting wheel being pushed away from a user using the dust collection system.

* * * * *